(12) United States Patent
Meadowcroft et al.

(10) Patent No.: US 7,425,098 B2
(45) Date of Patent: Sep. 16, 2008

(54) PLUGGABLE OPTICAL SUBASSEMBLY

(75) Inventors: David Meadowcroft, Stowmarket (GB); Stuart Wilkinson, Manningtree (GB)

(73) Assignee: Avago Technologies Fiber IP (Singapore) Pte Ltd, Singapore (SG)

( * ) Notice: Subject to any disclaimer, the term of this patent is extended or adjusted under 35 U.S.C. 154(b) by 144 days.

(21) Appl. No.: 10/868,609

(22) Filed: Jun. 15, 2004

(65) Prior Publication Data
US 2005/0041933 A1 Feb. 24, 2005

(30) Foreign Application Priority Data
Aug. 20, 2003 (GB) .................................. 0319505.4

(51) Int. Cl.
G02B 6/36 (2006.01)
(52) U.S. Cl. ............................. 385/92; 385/88; 385/91; 385/53; 361/816
(58) Field of Classification Search ............. 385/91–92, 385/53, 88; 361/728, 816; 985/53
See application file for complete search history.

(56) References Cited

U.S. PATENT DOCUMENTS

| | | | | |
|---|---|---|---|---|
| 6,335,869 | B1* | 1/2002 | Branch et al. ............... | 361/816 |
| 6,570,768 | B2 | 5/2003 | Medina ....................... | 361/747 |
| 6,592,269 | B1* | 7/2003 | Brophy et al. ................ | 385/92 |
| 6,805,573 | B2* | 10/2004 | Phillips et al. .............. | 439/352 |
| 2002/0018625 | A1* | 2/2002 | Grann et al. ................. | 385/88 |
| 2002/0093796 | A1* | 7/2002 | Medina ........................ | 361/728 |
| 2002/0149821 | A1* | 10/2002 | Aronson et al. ............. | 359/152 |
| 2003/0044121 | A1* | 3/2003 | Shang .......................... | 385/53 |
| 2003/0044129 | A1 | 3/2003 | Ahrens et al. ................. | 385/92 |
| 2003/0072540 | A1 | 4/2003 | Huang .......................... | 385/92 |
| 2003/0118293 | A1 | 6/2003 | Canace et al. ................ | 385/92 |
| 2003/0198025 | A1* | 10/2003 | Cao ............................ | 361/728 |
| 2003/0206403 | A1* | 11/2003 | Zaremba ..................... | 361/728 |
| 2004/0097136 | A1* | 5/2004 | Flickinger et al. ........... | 439/607 |
| 2004/0264879 | A1* | 12/2004 | McColloch et al. .......... | 385/81 |
| 2005/0245109 | A1* | 11/2005 | Torres et al. ............... | 439/76.1 |

FOREIGN PATENT DOCUMENTS

GB 2 373 374 9/2002

OTHER PUBLICATIONS

Industry MSA between Agilent Technologies, Nortel Networks and Agere Systems published on Jun. 17, 2002 regarding Hot Pluggable DWDM Transceivers.*
Multi-Source Agreement for Hot Pluggable OC-48 DWDM Transceivers, Jun. 17, 2002☐☐Agilent, Nortel, Agere announcement of an industry standard setting MSA.*
Littlejohn, British Patent Application No. GB 0319505.4 dated Nov. 6, 2003.

* cited by examiner

Primary Examiner—Frank G Font
Assistant Examiner—Guy G Anderson

(57) ABSTRACT

A pluggable optical module for use with optical communication systems, wherein the pluggable optical module comprises a housing having an opening arranged to receive a subassembly, wherein the subassembly is capable of being removably inserted into the housing.

14 Claims, 9 Drawing Sheets

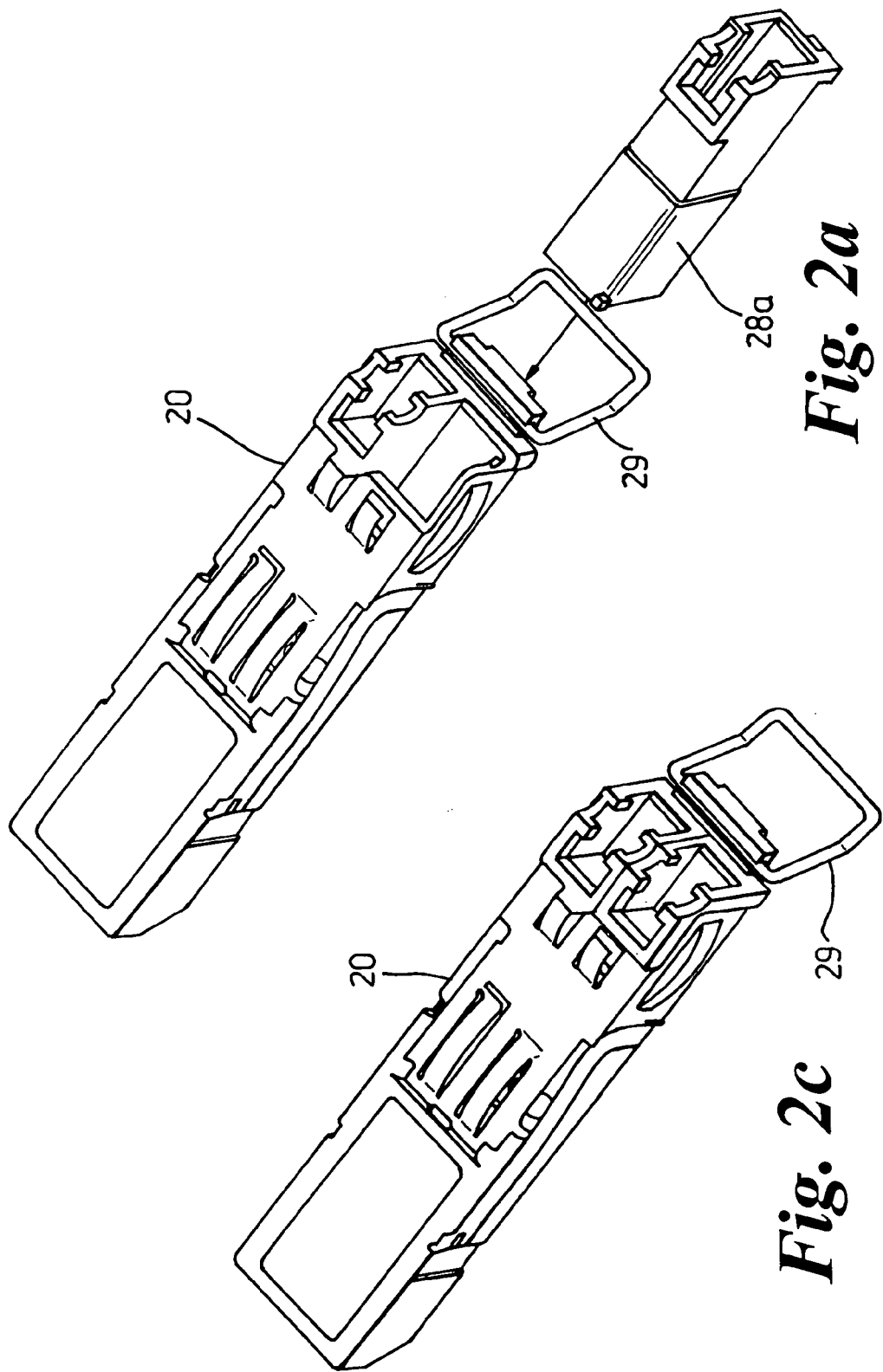

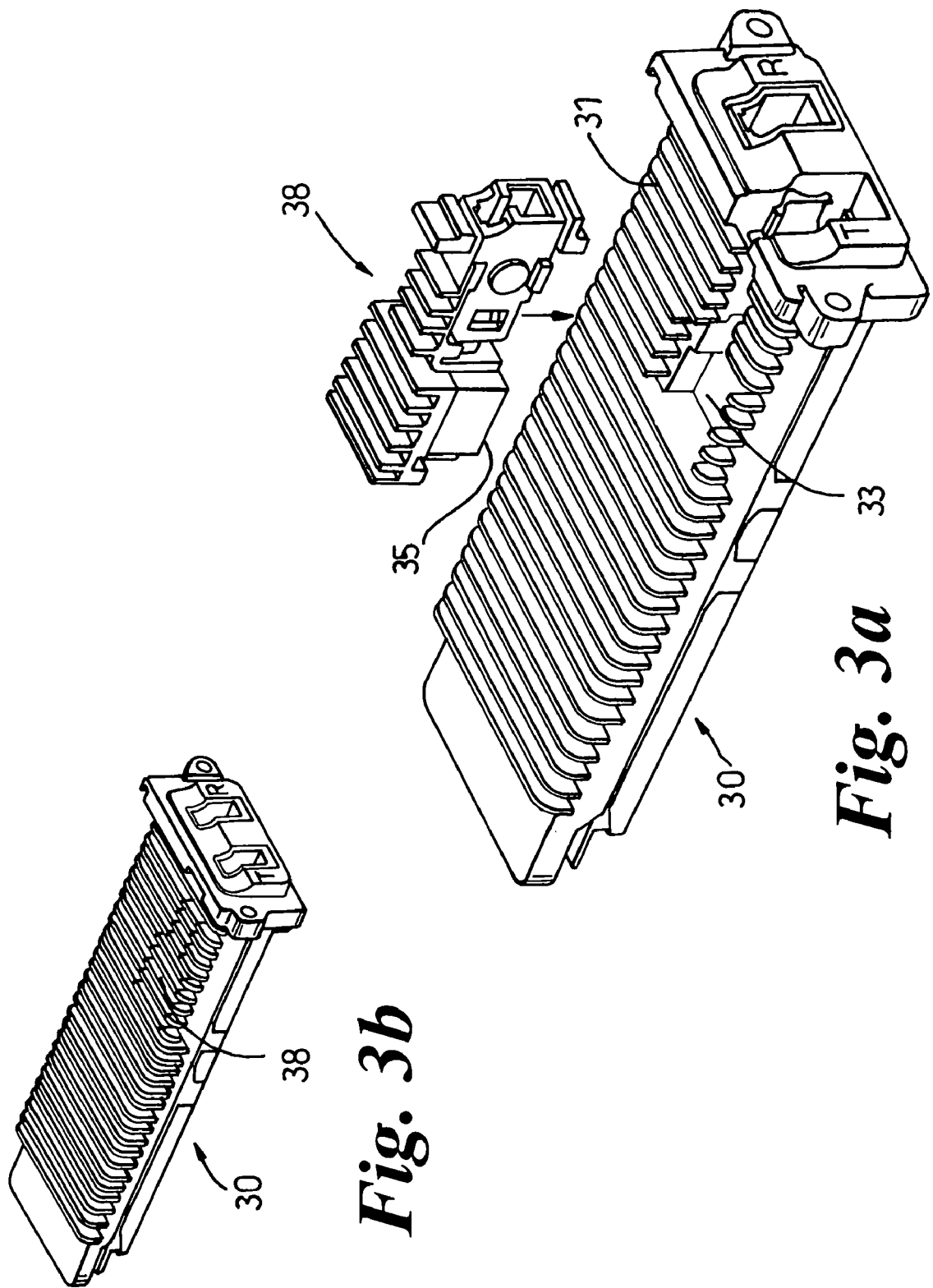

PLUGGABLE OPTICAL SUBASSEMBLY

FIELD OF THE INVENTION

The present invention relates to pluggable optical subassemblies for use with optical communications systems.

DISCUSSION OF THE BACKGROUND ART

Pluggable modules such as optical transmitters, receivers or transceiver are known and their use is becoming more commonplace in optical communications systems. European patent application number 01310415.3 discloses a known pluggable module, which houses both a transmitter and receiver which both fixedly disposed within the module housing. These modules can be easily inserted into a communication system's rack or chassis, often without having to power down the system. This is known in the art as "hot pluggability".

However, as communications systems evolve it is becoming desirable to change the wavelength or indeed the mode of operation of the module. For example, a system originally operating at 1300 nm using course wavelength division multiplexing (CWDM) may in time need to operate at 1550 nm and use dense wavelength division multiplexing (DWDM). Currently, such a change would require an entirely new module be inserted into the system chassis, or the existing module be removed and re-assembled with new parts to allow for the new functionality. This is both time-consuming and expensive.

Furthermore, many of the customer facing parameters of the module, such as physical size and electrical connection are becoming common to all optical modules of a certain type and are previously agreed to under what is known in the industry as "multi source agreements" or are dictated by standards set by, for example, IEEE.

Thus it is desirable to make use of the existing module housing and yet be able to easily and inexpensively change the internal functionality of the module.

It is an object of the present invention to provide a solution to the above mentioned problem.

SUMMARY OF THE INVENTION

According to the present invention there is provided a pluggable optical module comprising a housing, said housing being adapted to receive a subassembly, said subassembly capable of being removably inserted into said housing.

Thus the present invention provides an easy and inexpensive means for changing the functionality of an optical module. This may be achieved without having to remove the parent module from the system chassis or even having to power down the system.

BRIEF DESCRIPTION OF THE DRAWINGS

While the principle advantages and features of the invention have been described above, a greater understanding and appreciation of the invention may be obtained by referring to the drawings and detailed description of an embodiment, presented by way of example only, in which;

FIGS. 2a, 2b and 2c show an alternative embodiment of the present invention,

FIGS. 3a and 3b show yet a further embodiment of the present invention,

DETAILED DESCRIPTION OF THE PREFERRED EMBODIMENT

Figure 1A:
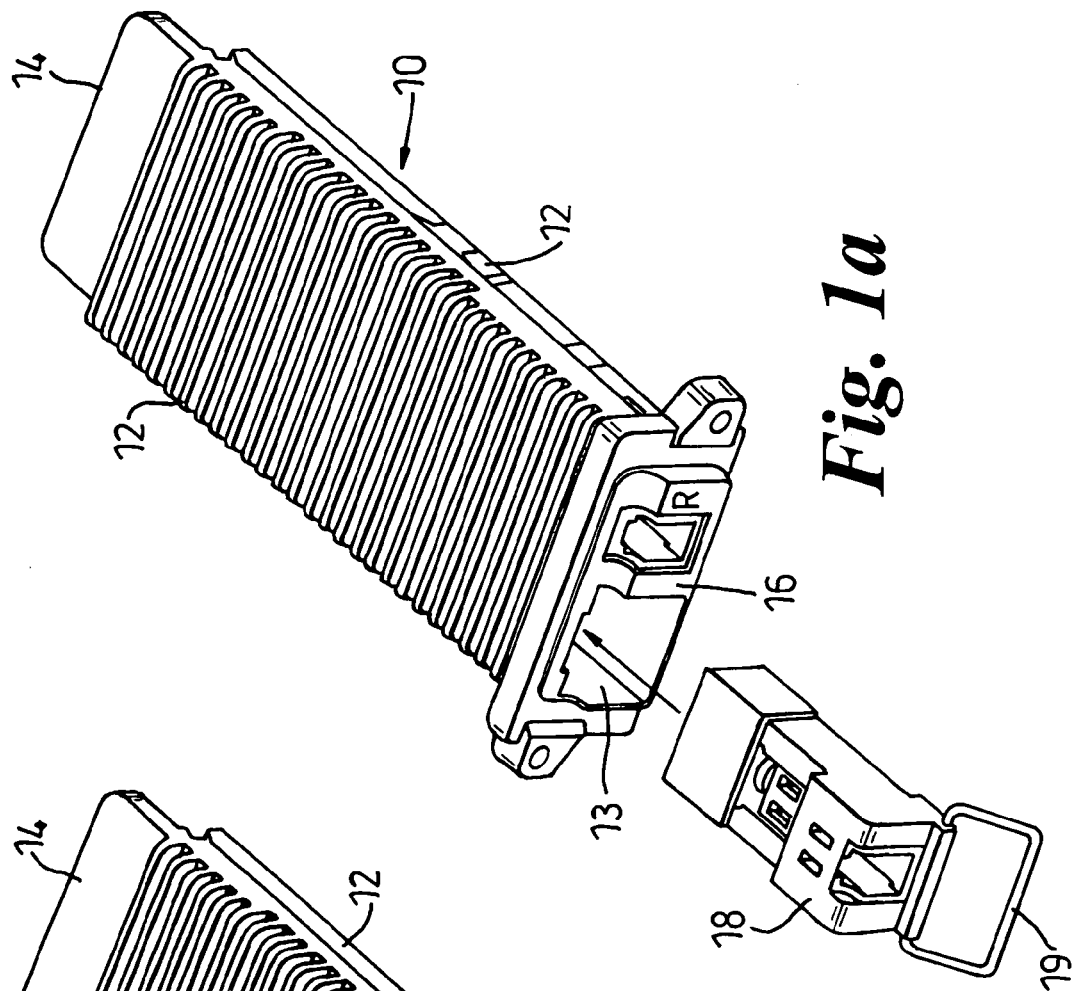
FIGS. 1a and 1b show an embodiment of the present invention.
Figure 1B:
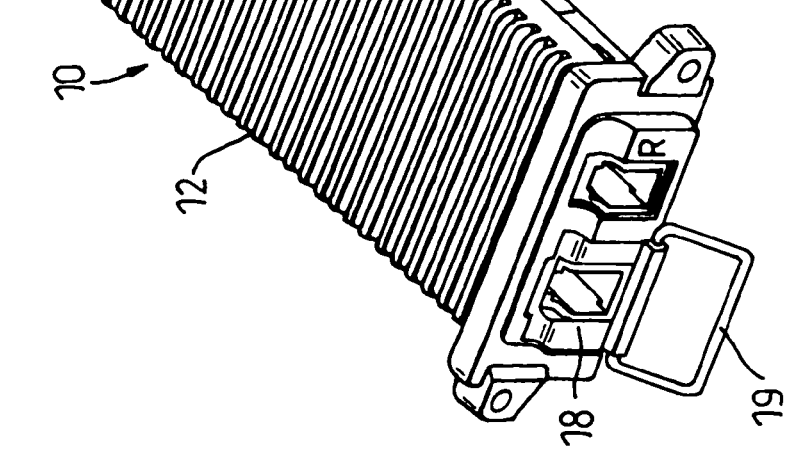

As seen in FIG. 1a, the present invention comprises a pluggable module 10, which has outer physical parameters common to all types of transceivers or transponder made according to an agreed standard. For example, the module seen in FIGS. 1a and 1b is designed according to the DWDM pluggable transceiver MSA (http://www.hotplugdwdm.org/msa.htm). Module 10 is easily inserted into a system chassis via the grooves 12 disposed by either side of the module. Electrical connection between the module and the system is established via electrical connectors 14 disposed at the rear of the module. Now according to the present invention, module 10 is arranged to receive, for example, via an opening 13 in front plane 16 a pluggable subassembly 18. The subassembly could be a receiver subassembly or a transmitter subassembly. The module could be arranged to receive one pluggable subassembly, for example, a transmitter assembly, or two subassemblies, such as a transmitter subassembly and a receiver subassembly. The subassembly could also be a transceiver subassembly. The subassembly may have a latch 19 disposed at the front in order to aid in the insertion and/or removal of the subassembly from the parent module 10. The subassembly may include some local means for retaining the subassembly within the parent module. Furthermore, the parent module and subassembly may be arranged so that the subassembly can be inserted or removed from the parent module without having to power down the module or host system, thus being hot pluggable.

FIG. 1a shows the subassembly 18 just prior to being inserted into opening 13 in the parent module and FIG. 1b shows the subassembly fully inserted into the parent module.

The subassembly 18 of FIGS. 1a and 1b may be, for example, a CWDM type optical transmitter operating at 1300 nm. Should the operator wish to change the configuration of his system to for example, to a DWDM system operating at 1550 nm, the CWDW subassembly can be easily removed and a new optical transmitter subassembly configured to operate as a DWDM system at 1550 nm inserted. Alternatively, the CWDM wavelength could be the same as the DWDM wavelength with the operator simply wanting to swap a 1550 nm CWDM part for a 1550 DWDM part. Similarly, an operator customer may wish to change a 1300 nm CWDM part for a 1550 CWDM part. Furthermore, as will be appreciated by the person skilled in the art, the wavelengths of the subassemblies could vary anywhere between 1270 nm to 1620 nm or beyond, depending on the system's requirements. This applies to both CWDM and DWDM subassemblies. Alternatively, it may be desirable to change the receiver subassembly from a PIN type receiver to an APD based receiver.

Figure 2B:
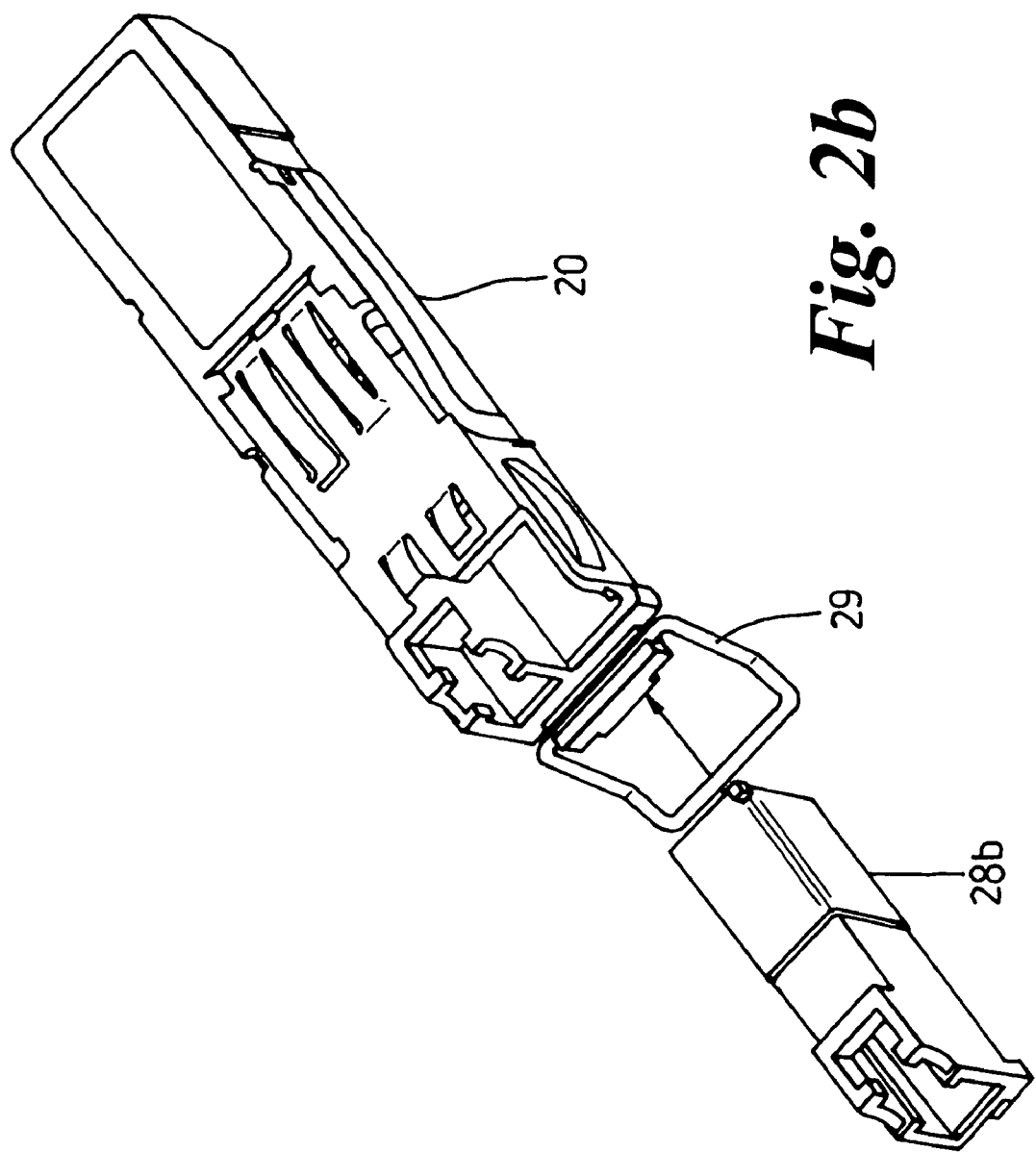

FIGS. 2a, 2b and 2c show an alternative embodiment of the present invention in which the parent module 20 is of a type known in the industry as Small Form-Factor Pluggable and has external features which conform to industry standards known as SFP (Small form-factor pluggable transceiver MSA) (http)://schelto.com/SFP/SFP%20MSA.pdf). As with the embodiment shown in FIGS. 1a and 1b, it is possible to have a pluggable transmitter subassembly 28a, a pluggable receiving subassembly 28b, or both. Here the latch 29 is part of the parent module to aid in inserting and removing the parent from a host system chassis. The latch may also function to hold the subassemblies securely in place.

In FIGS. 3a and 3b yet a further embodiment of the present invention is shown in which the pluggable subassembly 38 is inserted into a suitable configured opening 33 in a top surface 31 of the parent module 30. The subassembly can snap fit into place with electrical connections being established between the subassembly and the parent module via suitable designed electrical connection on the underside 35 of the subassembly. For example, a BGA (Bulk Grid Array) type connector could be used. As with the previous embodiments, the parent module can be configured to accept either a transmitter subassembly, receiver subassembly, or both.

Figure 4:
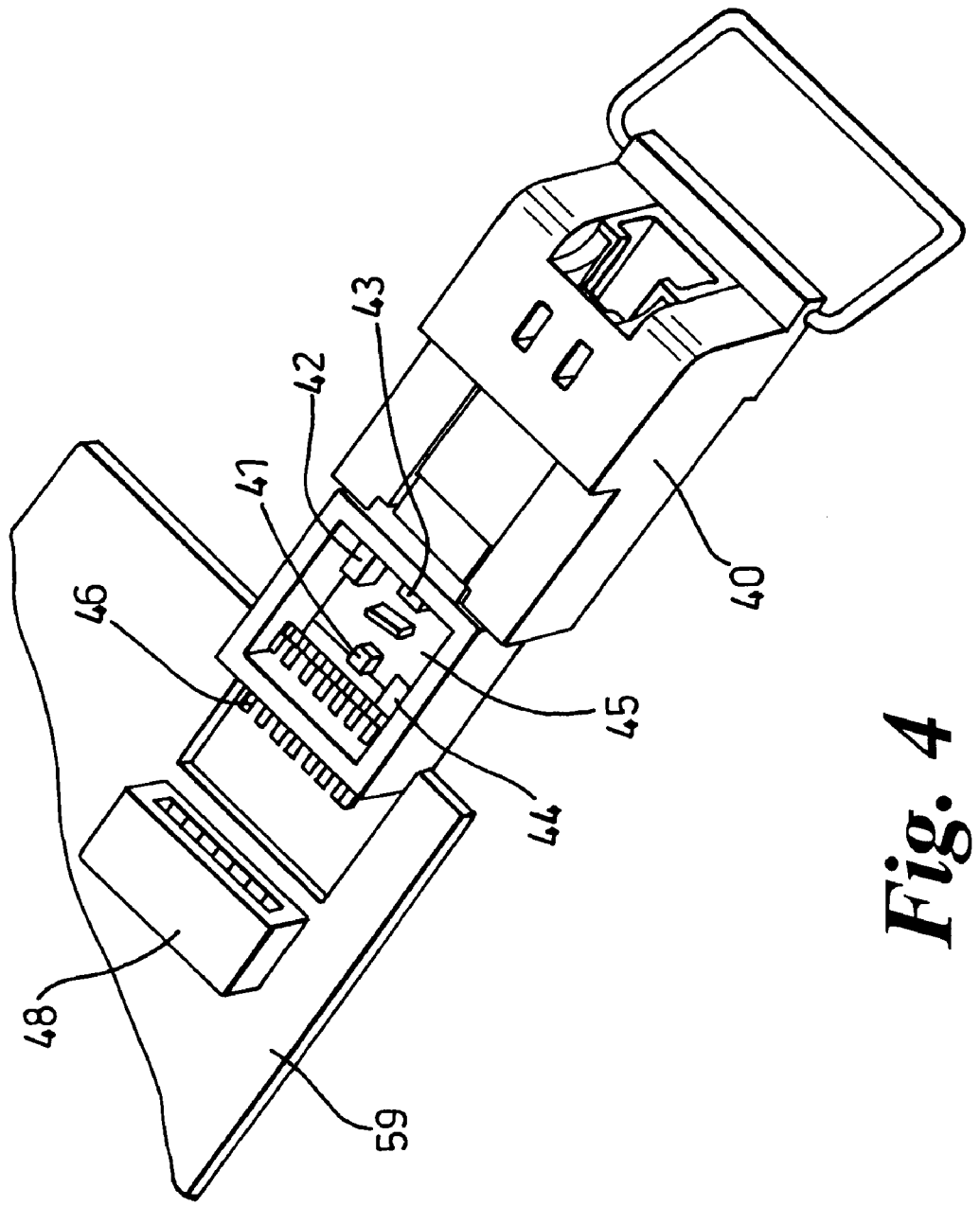
FIG. 4 shows an exposed view of a possible internal configuration of the pluggable subassembly shown in FIG. 1a, FIG. 5 shows an exposed view of a further possible internal configuration of the pluggable subassembly shown in FIG. 1a, FIG. 6 shows a more detailed view of an example of the electrical connection means of the pluggable subassembly shown in FIG. 1a, and FIGS. 7 and 8 show examples of means for detecting the type of pluggable subassembly.

As previously stated, the subassembly could be a transceiver or receiving subassembly. The subassembly could be suitable for DWDM or CWDM operation. For example, as seen in FIG. 4, the subassembly of the type shown in FIGS. 1a and 1b is shown with its internal components exposed. In this example the subassembly 40 is a transmitter configured for DWDM operation comprising a laser 41, optics 42, wavelength isolator 43, temperature sensor 44, and a temperature control 45 such as a TEC (thermoelectric cooler). As will be appreciated components can be added or removed from the subassembly depending on the specific requirements of the subassembly. For example, as seen in FIG. 5, subassembly 50 is configured for CWDM operation and comprises a laser 51 and optics 52.

Figure 5:
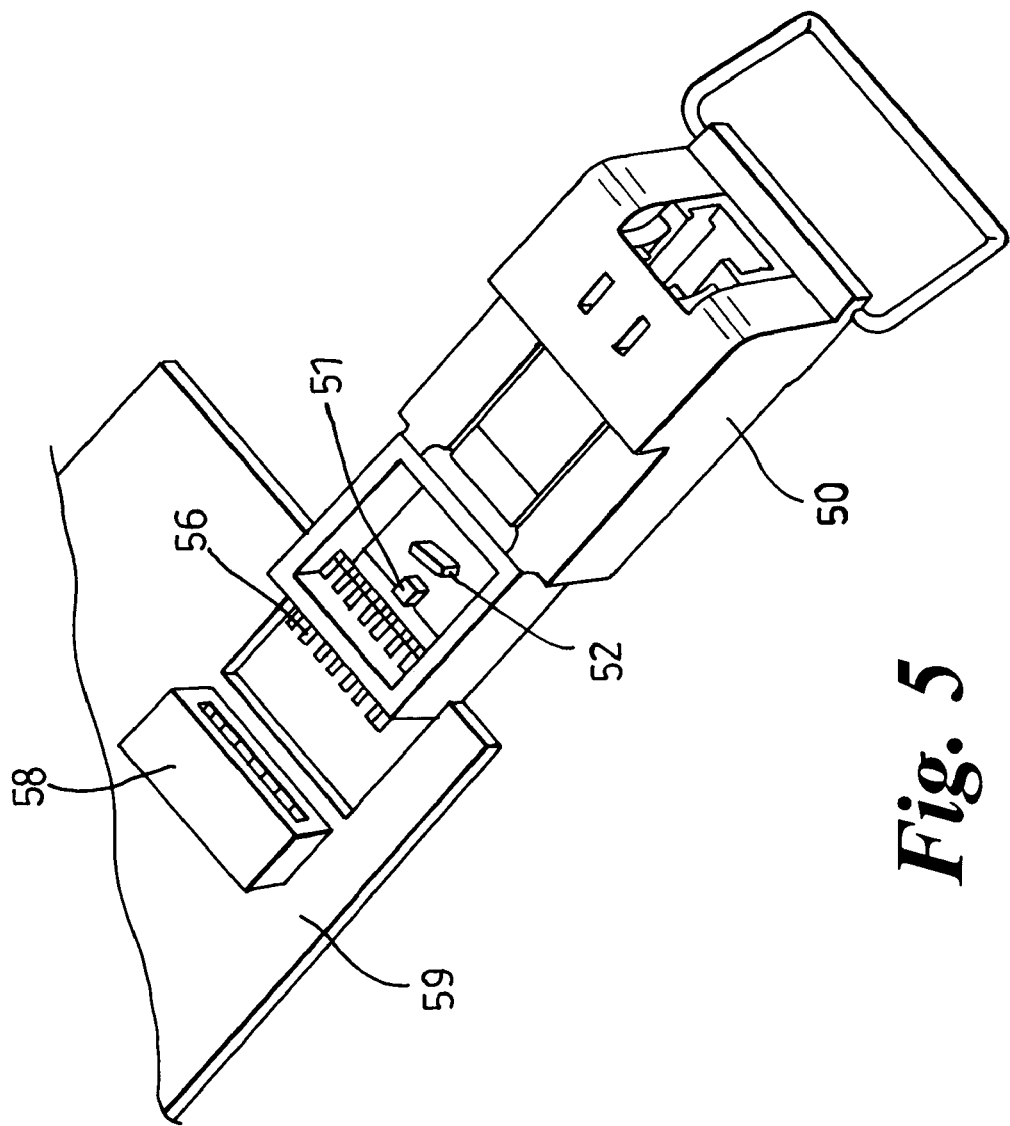

Both the subassemblies 40 and 50 of FIGS. 4 and 5 have electrical connectors 46, 56 disposed at the rear of the subassembly which make electrical connection with electrical sockets 48, 58 disposed on PCBs 49, 59 respectively.

Figure 6:
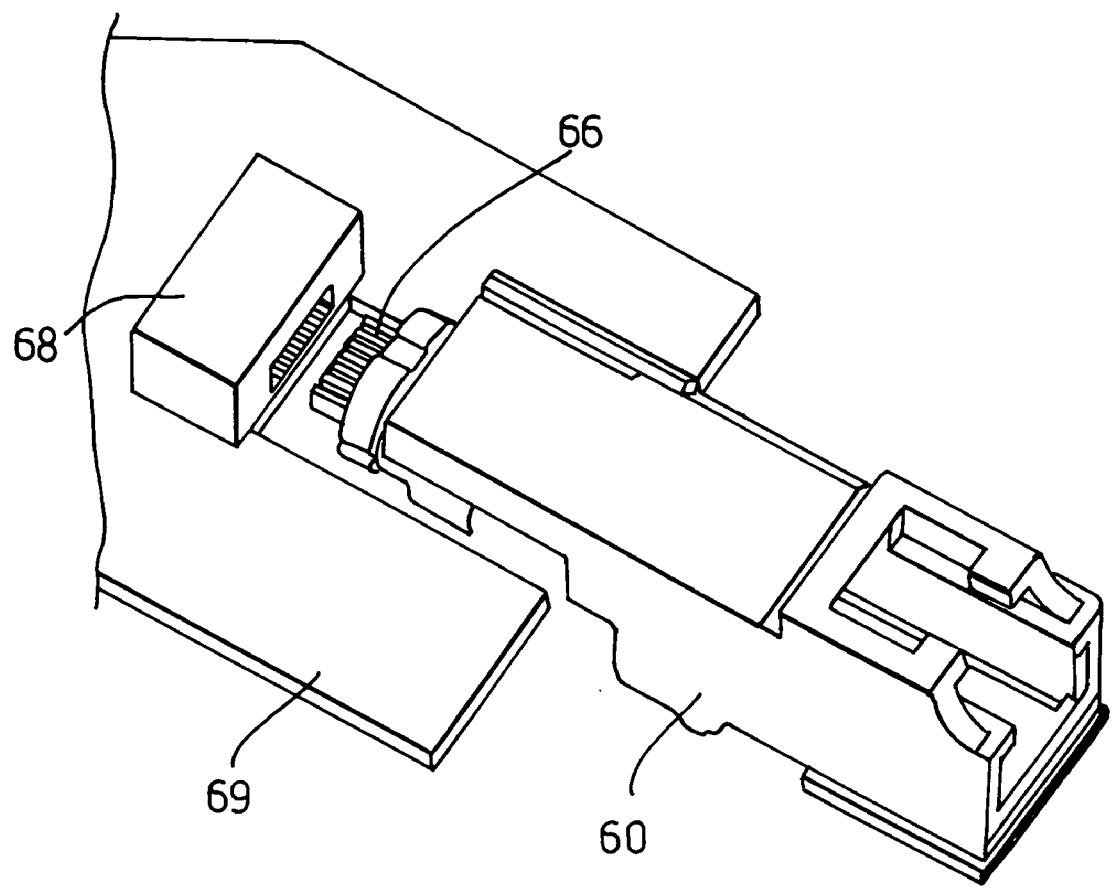

As seen in FIG. 6, an alternative electrical connector 66 may be used with receiver subassembly 60 and electrically connected to the parent module via electrical socket 68 located on PCB 69, much the same way as for transmitter subassemblies.

Figure 7:
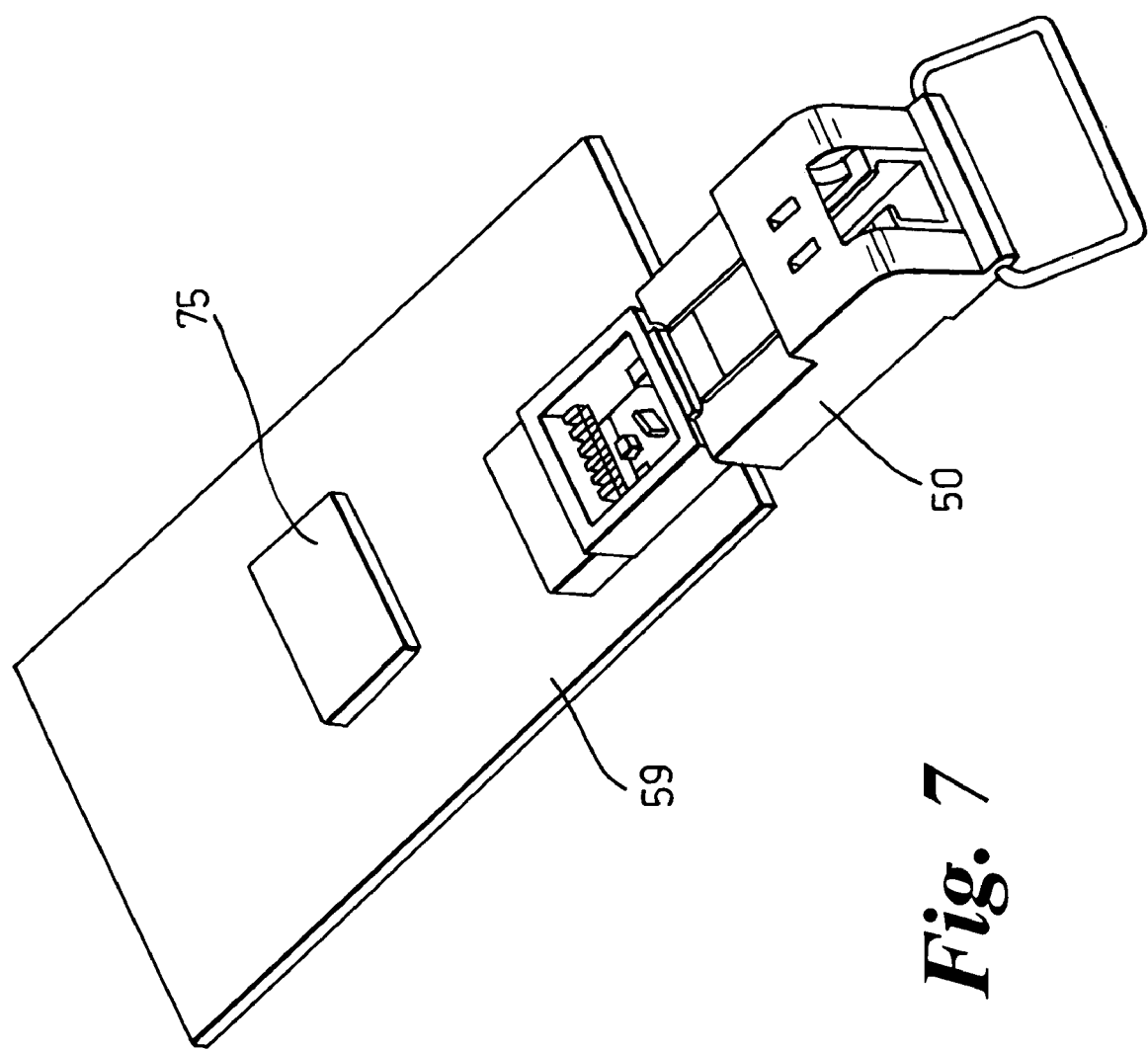
Figure 8:
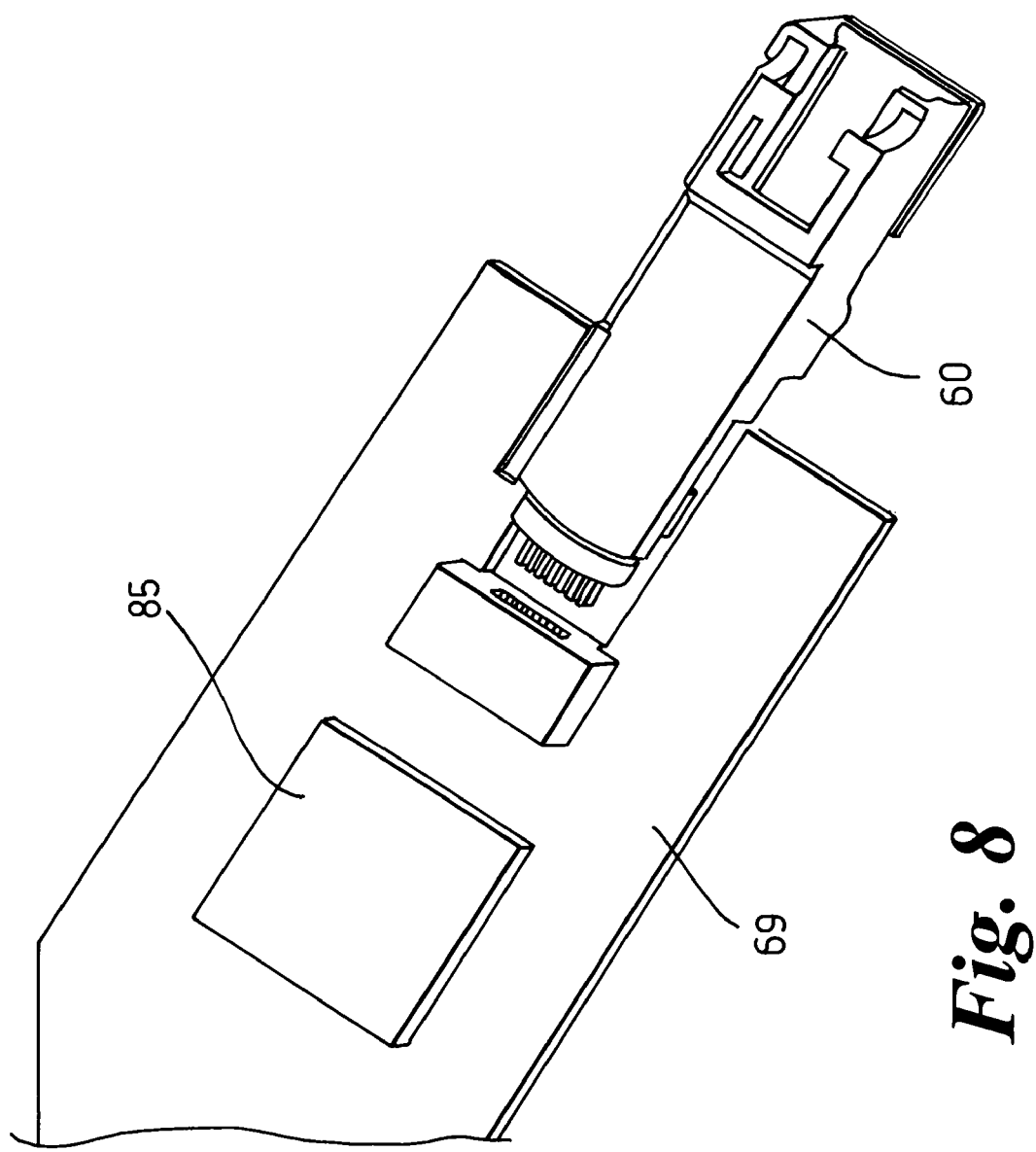

PCBs 49, 59, 69 are located within the parent modules and may form the base onto which a variety of other components required by the parent module are disposed. For example as seen in FIGS. 7 and 8 an integrated circuit (IC) 75, 78 may also be located on the PCB 59, 79. The IC may be configured to examine the subassembly once it has been plugged into the parent module to identify what type of subassembly is present, for example a CWDM or DWDM transmitter. Similarly, the IC 75 could identify whether the receiver subassembly 70 contained a PIN or ADP type detector.

Once identification of the specific configuration of the subassembly had been determined, preprogrammed operating parameters could be executed and the transceiver or transponder module could begin to function accordingly.

Advantageously, the present invention allows for optical transceiver and transponder modules to be easily and inexpensively upgraded from one wavelength to another or from CWDM to DWDM configuration without replacing the entire module.

It is not intended that the present invention be limited to the above embodiments and other modifications and variations are envisaged within the scope of the claims.

What is claimed is:

1. A pluggable optical module for inserting into a system chassis, the module comprising a housing, said housing having an opening arranged to receive a transmitter subassembly or a receiver subassembly, wherein said subassembly is capable of being removably inserted into said housing of said module without having to remove the module from the system chassis, the subassembly having a latch attached to a front face thereof, said latch aiding in the insertion and/or removal of said subassembly from said housing.

2. A module as claimed in claim 1, wherein said housing comprises a further opening for receiving a further removable subassembly, said further removable subassembly being a transmitter subassembly or a receiver subassembly.

3. A module as claimed in claim 1, wherein said subassembly has an electrical connector and said module has an electrical receiver both being arranged such that when said subassembly is inserted into said opening in said module, electrical connection is established there between.

4. A module as claimed in claim 1, wherein said opening is disposed on a front plate of said housing.

5. A module as claimed in claim 3 wherein said electrical connector is disposed at the rear of said subassembly.

6. A module as claimed in claim 1, wherein said opening is disposed on both a top surface and a front surface of said housing.

7. A module as claimed in claim 6, wherein said subassembly has an electrical connector, said electrical connector being disposed on an under surface of said subassembly.

8. A module as claimed in claim 1, wherein said subassembly is an optical transmitter.

9. A module as claimed in claim 1, wherein said subassembly is a receiver.

10. A module as claimed in claim 1, wherein said housing has a baseplate disposed therein for receiving said subassembly.

11. A module as claimed in claim 1, wherein said module further comprises an integrated circuit, said integrated circuit being configured to determine the type of subassembly inserted within said module.

12. A module as claimed in claim 1, wherein said subassembly is hot pluggable.

13. A module as claimed in claim 1, wherein said subassembly is a CWDM transmitter.

14. A module as claimed in claim 1, wherein said subassembly is a DWDM transmitter.

* * * * *